(12) United States Patent
Sagan et al.

(10) Patent No.: US 9,025,230 B2
(45) Date of Patent: May 5, 2015

(54) OPTICAL LINE OF SIGHT TOGGLE MODULE

(75) Inventors: Stephen F. Sagan, Lexington, MA (US); Gerard M. Perron, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 323 days.

(21) Appl. No.: 13/606,190

(22) Filed: Sep. 7, 2012

(65) Prior Publication Data

US 2013/0063797 A1  Mar. 14, 2013

Related U.S. Application Data

(60) Provisional application No. 61/532,706, filed on Sep. 9, 2011.

(51) Int. Cl.
*G02B 26/08* (2006.01)
*G02B 26/10* (2006.01)
*G02B 27/42* (2006.01)

(52) U.S. Cl.
CPC ............ *G02B 26/10* (2013.01); *G02B 27/4233* (2013.01)

(58) Field of Classification Search
CPC ..... G02C 7/02; A61F 9/045; G01M 11/0207; G01M 11/0228; G02B 26/10; G02B 27/4233; G02B 27/646; G02B 15/14
USPC ......... 359/209.1–210.1, 211.6, 17–20, 197.1, 359/204.5, 207.2, 558
See application file for complete search history.

(56) References Cited

U.S. PATENT DOCUMENTS 4,974,950 A  *  12/1990  Yamazaki et al. ............ 359/557

* cited by examiner

*Primary Examiner* — James Phan
(74) *Attorney, Agent, or Firm* — Daniel J. Long (57) ABSTRACT

An optical LOS toggle uses two refractive optical elements located in the afocal space of an optical sensor. Optical surfaces of the two elements are shaped appropriately to work in combination with lateral displacements of the two elements such that the LOS angle is shifted. For a prescribed, discrete LOS shift, the optical image quality of the toggle module is corrected by a combination of aspheric shapes and diffractive surfaces on the optical surfaces of the two elements. To maintain performance along any radial direction and simplify fabrication, these aspheric or spheric shapes and diffractive surfaces should be rotationally symmetrical. Image quality is further improved through proper selection of the optical materials used to construct the optical elements.

18 Claims, 10 Drawing Sheets

OPTICAL LINE OF SIGHT TOGGLE MODULE

CROSS-REFERENCE TO RELATED APPLICATIONS

This Application claims rights under 35 USC §119(e) from U.S. Application Ser. No. 61/532,706 filed Sep. 9, 2011, the contents of which are incorporated herein by reference.

TECHNICAL FIELD

Embodiments are generally related to optical system. Embodiments are also related to optical Line Of Sight (LOS) toggle apparatus. Embodiments are additionally related to system and method of scanning a wide field of view optical sensor through multiple Fields Of Regard (FOR).

BACKGROUND OF THE INVENTION

One of the most important and difficult components in a wide Field Of View (FOV) optical sensor is the beam steering mechanism, or "Line Of Sight (LOS) toggle." Optical sensors, especially high resolution wide FOV sensors, often rely on composite imagery to generate a complete image because imaging circuitry from Focal Plane Arrays (FPAs) and other electronic components of the sensor require too much space to generate a single continuous image in one data capture. Accordingly, FPAs are often arranged so that each complete image (frame) consists of two or more data captures taken in rapid succession.

In these composite imaging systems, each data capture covers an equal portion of the wide FOV such that, when all data captures associated with a frame are put together, a complete image is formed. However, for working of composite imagery systems, the optical sensor system must be capable of rapidly switching between multiple Fields Of Regard (FORs). This switching must occur at least twice per frame, one for each of the FOR. For example, if the composite image was designed to compile two data captures to create a complete frame, the optical sensor system would need to adjust lens FOR orientation twice per frame. This means that a video frame rate of 72 frames per second would require 144 mechanical adjustments of highly sensitive lenses per second, and some military applications exceed this frame rate.

The traditional method of switching between FORs is to use a Risley prism pair. These devices use two wedged lenses, which are then rotated relative to one another in order to alter the bending angle of light passing through the Risley prism, thereby adjusting the FOR. However, Risley prisms require heavy, complex mechanical drives to provide the circumferential rotation necessary to switch between FORs. Also, Risley prisms are inefficient for high-speed FOR switching because a two-mode Risley prism requires a full 180 degree rotation for each switch, requiring excessive motion and energy to operate.

Another known method of scanning multiple FORs is a "ball and socket" device which uses two substantially equal spherical lenses arranged so that the convex side of one lens mates with the concave side of the second lens. This device also requires that a thin layer of lubricant be deposited between the two lens surfaces to maintain image quality and functionality. Unfortunately, this simple spherical design results in both spherical and chromatic aberrations, which are undesirable. Furthermore, some wide FOV imaging systems require that the optical components operate within a vacuum, making lubricants, which tend to outgas and thereby ruin a vacuum atmosphere, an unacceptable component of the FOR scanning mechanism used in outer space system.

A need therefore exists for a vacuum-compatible optical LOS toggle capable of providing aberration corrected, high quality images while minimizing the size of mechanical drive machinery and limiting movement of the optical components.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for optical system.

It is another aspect of the disclosed embodiments to provide optical Line Of Sight (LOS) toggle apparatus.

It is a further aspect of the disclosed embodiments to provide for system and method of scanning a wide field of view optical sensor through multiple Fields Of Regard (FOR).

It is another aspect of the disclosed embodiments to provide a vacuum-compatible optical LOS toggle capable of providing aberration corrected.

It is yet another aspect of the disclosed embodiments to provide high quality images while minimizing the size of mechanical drive machinery and limiting movement of the optical components.

It is another aspect of the disclosed embodiments to provide an optical LOS toggle that uses two refractive optical elements located in the afocal space of an optical sensor. The afocal space proceeding the imaging optical system or an aberration corrected afocal space within the optical system are both acceptable locations for the elements. Optical surfaces of the two elements are shaped appropriately to work in combination with lateral displacements of the two elements such that the LOS angle is shifted. Further, the image quality is optimized for vacuum, air, or another gaseous substance to be interposed between the optical surfaces, rather than a lubricant.

Discrete LOS shift, the optical image quality of the toggle module is corrected by a combination of aspheric or spheric shapes and diffractive surfaces on the optical surfaces of the two elements in the module. In order to maintain performance along any radial direction and to simplify fabrication, these aspheric or spheric shapes and diffractive surfaces should be rotationally symmetrical. Image quality is further improved through proper selection of the optical materials used to construct the optical elements.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
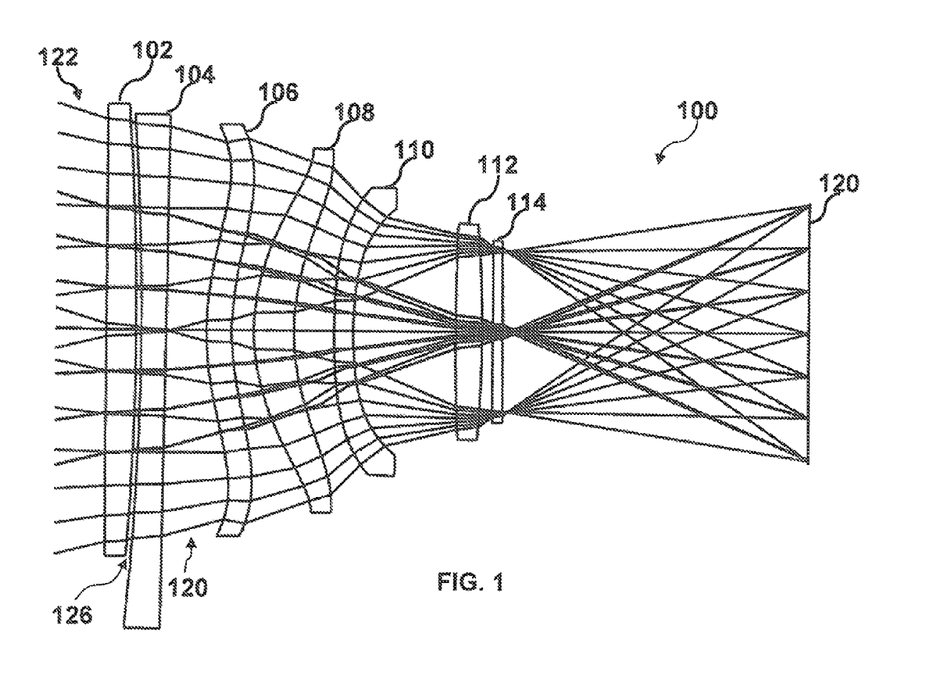
FIG. 1 illustrates a schematic diagram of an optical LOS toggle utilized to scan multiple FORs in an imaging system, in accordance with the disclosed embodiments.

FIG. 1 illustrates a schematic diagram of an optical LOS toggle module 100 utilized to scan multiple FORs in an imaging system. The optical LOS toggle module 100 has two refractive optical elements 102 and 104 located in the afocal space 120 of an optical sensor. Optical surfaces of the two elements 102 and 104 are shaped appropriately to work in combination with lateral displacements of the two elements 102 and 104 such that the LOS angle is shifted. The two elements 102 and 104 are moved in opposite directions with equal and opposite forces to maintain an inertially stable platform. An image 120 is generated by passing infra red rays 122 by utilizing the optical elements 106, 108, 110, 112 and 114. An un-lubricated interface 126 is placed between the optical surfaces of two refractive optical elements 102 and 104. Note that the two refractive optical elements 102 and 104 are constructed from Silicon (Si) and other materials such as Germanium (Ge), or a combination of Silicon and Germanium.

Figure 2A:
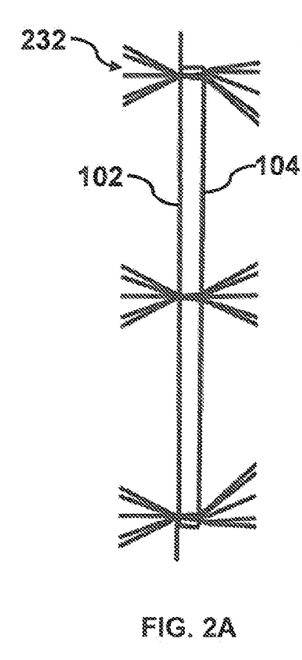
FIGS. 2A-2C illustrate schematic diagram of optical elements of optical LOS toggle depicted in FIG. 1 showing different combinations (2B and 2C) of aspheric shapes and diffractive surfaces compared to a wedge element (2A), in accordance with the disclosed embodiments.
Figures 2B, 2C:
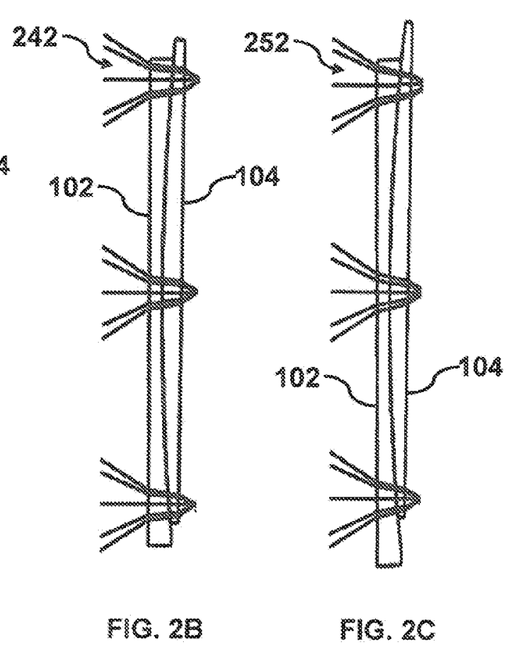
Figure 3A:
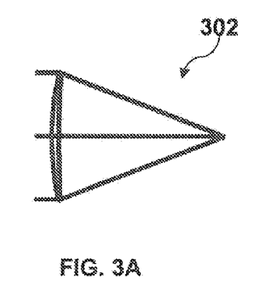
FIGS. 3A-3F illustrate schematic diagram of one of the two elements of the optical LOS toggle depicted in FIG. 1 utilized for correcting optical image quality, in accordance with the disclosed embodiments.
Figure 3B:
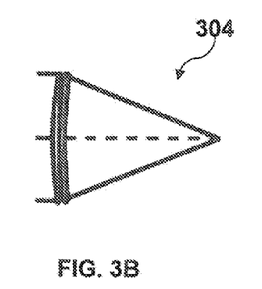
Figure 3C:
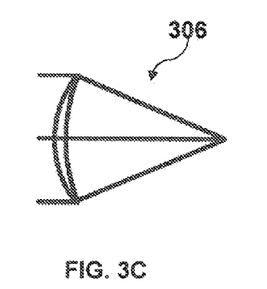
Figure 3D:
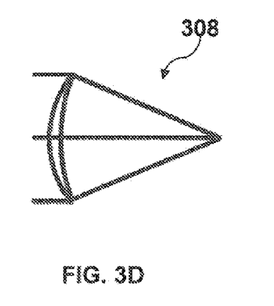
Figure 3E:
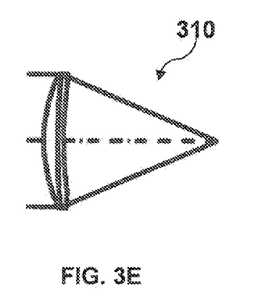
Figure 3F:
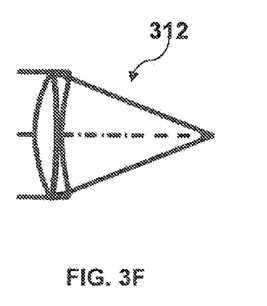
Figure 4A:
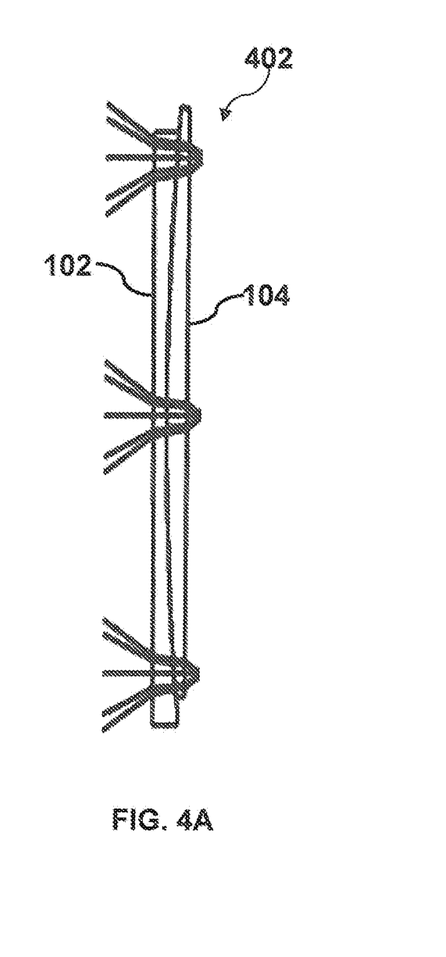
FIGS. 4A-4D illustrate schematic diagram of optical LOS toggles showing different combinations of aspheric shapes and diffractive surfaces, in accordance with the disclosed embodiments.
Figure 4B:
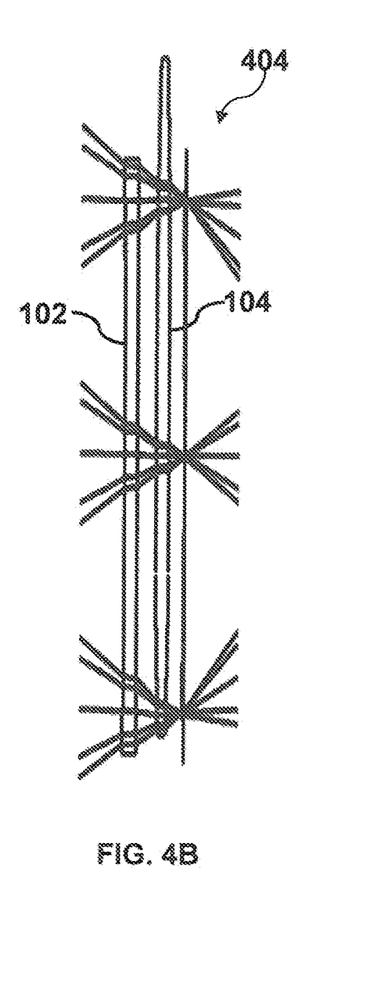
Figure 4C:
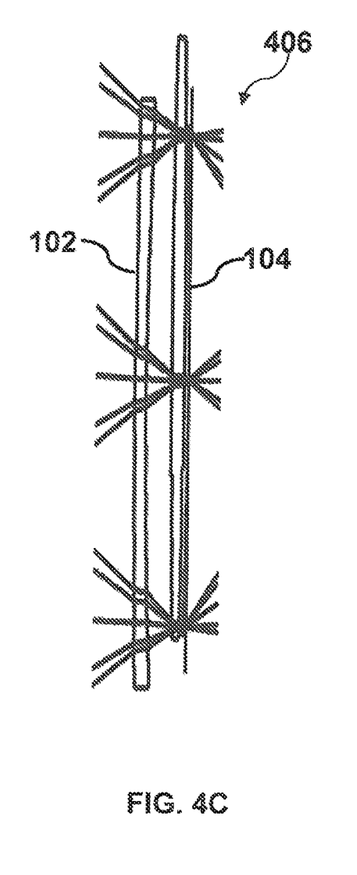
Figure 4D:
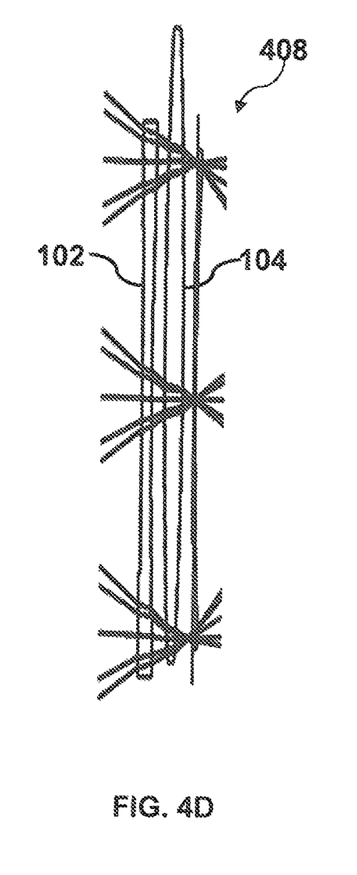

Referring to FIGS. 2A-2C, schematic diagram of optical LOS toggles 232, 242 and 252 having optical elements 102 and 104 depicted in FIG. 1 is disclosed. The optical elements 102 and 104 of optical LOS toggle 232 are made of Germanium and are of wedge shaped. The optical LOS toggle 242 has optical elements 102 and 104 which are made of Germanium and are ball and socket shaped. The optical elements 102 and 104 of optical LOS toggle 252 are made of Zinc selenide and are of ball and socket shaped. The Table 1 provides the various design features of Autonomous Real-time Ground Ubiquitous Surveillance (ARGUS) Long Wave Infrared (LWIR) toggles used in this invention.

TABLE 1

|  | Wedge (Ge) | Wedge (Ge/DOE*) | Ball & Socket (Ge/Sphere) | Ball & Socket (Ge/DOE**) | Ball & Socket (ZnSe/DOE**) |
|---|---|---|---|---|---|
| Axis IQ ($\lambda$ rms) | 0.087 | 0.020 | 0.087 | 0.022 | 0.092 |
| FOV IQ ($\lambda$ rms) | 0.088 | 0.020 | 0.100 | 0.048 | 0.108 |
| Transmission | 0.917 | 0.870 | 0.840 | 0.758 | 0.866 |
| Weight (kg) | ~9.5*** | ~9.5*** | 9.36 | 9.37 | 10.67 |
| Toggle (dY, d$\alpha$) | 180° d$\gamma$ Rotation | 180° d$\gamma$ Rotation | 6.6 mm, 0.3° Roll | 6.6 mm, 0.3° Roll | 13.5 mm, 0.6° Roll |
| IQ Limitation | Primary Lateral Color | Secondary Lateral Color | Primary Lateral Color | Off-axis Coma | Secondary Lateral Color |

The single asterisk (*) represents achromatic correction can be achieved using refractive (crown and flint glass pair) or diffractive such as Diffractive Optical Element (DOE) linear power, double asterisk () represents correction with rotationally DOE (with lateral color>330 µm) may also include conic or aspheric and triple asterisk (*) represents weight of wedge is half prism and half counterweight.

FIGS. 3A-3F illustrate schematic diagram of one of the two elements of the optical LOS toggle in various configurations 302, 304, 306, 308, 310 and 312 utilized for correcting optical image quality, in accordance with the disclosed embodiments. The optical elements 102 or 104 of the optical LOS toggle 302 is made of Germanium. The optical elements 102 or 104 of the optical LOS toggle 304, 306, 308, 310 and 312 is made of Germanium and DOE, Germanium and ZnSe, ZnSe and DOE, AMTIR and DOE, AMTIR and ZnS and AMTIR and ZnSe respectively.

The Table 2 provides the various design features of Autonomous Real-time Ground Ubiquitous Surveillance (ARGUS) Long Wave Infrared (LWIR) toggle elements 302, 304, 306, 308, 310 and 312 depicted in FIG. 3A-3F utilized for various degrees of image quality and color correction (depicted by Axis IQ and IQ Limitor).

TABLE 2

|  | Ge | Ge w/ DOE | Ge & ZnSe | ZnSe w/ DOE | AMTIR1 w/ DOE | AMTIR1 & ZnS | AMTIR1 & ZnSe |
|---|---|---|---|---|---|---|---|
| Axis IQ ($\lambda$ rms) | 0.357 | 0.060 | 0.089 | 0.367 | 0.203 | 0.048 | 0.017 |
| Transmission | 0.917 | 0.870 | 0.90 | 0.930 | ~0.90 | ~0.74 | ~0.84 |
| Weight (kg) | 2.28 | 2.27 | 5.30 | 3.94 | 3.16 | 6.48 | 11.34 |

TABLE 2-continued

|  | Ge | Ge w/ DOE | Ge & ZnSe | ZnSe w/ DOE | AMTIR1 w/ DOE | AMTIR1 & ZnS | AMTIR1 & ZnSe |
|---|---|---|---|---|---|---|---|
| Significant IQ Limitator | Primary Axial Color | Secondary Axial Color | Secondary Axial Color | Secondary Axial Color | Secondary Axial Color | Secondary Sph-Chrom | Spherical |

FIGS. 4A-4D illustrate schematic diagram of optical elements 102 and 104 of optical LOS toggles 402, 404, 406 and 408 showing different combinations of aspheric shapes and diffractive surfaces. The optical elements 102 and 104 of optical LOS toggle 402 are made of Germanium and are of ball and socket shaped where toggle is achieved by a combination of lateral displacement and tilt of the elements or a rotation about a remote point. The optical LOS toggle 404 has optical elements 102 and 104 which are made of Germanium and are lateral displaced (DEC) toggle shaped. The optical LOS toggle 406 has optical elements 102 and 104 that are made of AMTIR and Germanium and are of DEC toggle shaped. The optical elements 102 and 104 of optical LOS toggle 252 are made of AMTIR and Germanium and are of DEC toggle shaped.

The Table 3 provides the various design features of Autonomous Real-time Ground Ubiquitous Surveillance (ARGUS) Long Wave Infrared (LWIR) toggles used in this invention.

TABLE 3

|  | Ball & Socket (Ge•Sphere) | Ball & Socket (ZnSe•DOE*) | DEC Toggle (Ge & Ge) | DEC Toggle (AMTIR•DOE & Ge) | DEC Toggle (ZnSe•DOE) |
|---|---|---|---|---|---|
| Axis IQ (λ rms) | 0.087 | 0.085 | 0.107 | 0.056 | .107 |
| FOV IQ (λ rms) | 0.096 | 0.088 | 0.111 | 0.114 | 0.107 |
| Transmission | 0.840 | 0.866 | 0.840 | 0.747 | 0.866 |
| Weight (kg) | 9.36 | 10.67 | 8.88 | 8.07 | 10.39 |
| Toggle (dY, dα) | 6.6 mm, 0.3° Roll | 13.5 mm, 0.6° Roll | 0.30 mm | −11.7 mm, 18.3 mm | 0.30 mm |
| Toggle IQ** (λ rms) | 0.380/0.001 | 0.096/0.001 | 0.004/0.099 | 0.009/0.035 | 0.004/0.049 |
| DOE** (λ rms, min) | 0.0 | 1.8 | 0.0 | 0.5 | 1.02 |
| Temperature effect | TBD | TBD | TBD | TBD | TBD |
| IQ Limitation | Primary Lateral Color | Secondary Lateral Color | Primary Lateral Color | Primary Lateral Color | Primary Lateral Color |

Figure 5:
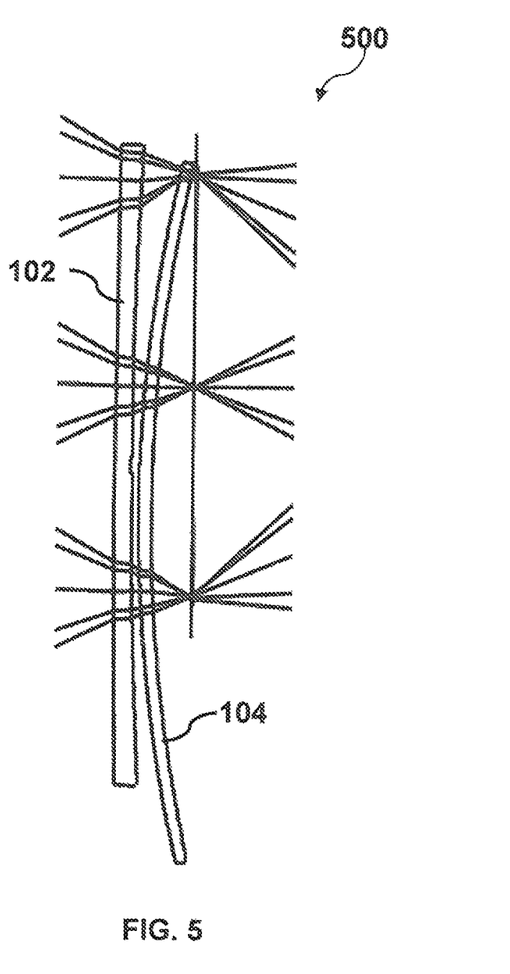
FIGS. 5-7 illustrate schematic diagram of optical refractive achromat LOS toggle utilized to scan multiple FORs in an imaging system, in accordance with the disclosed embodiments.
Figure 6:
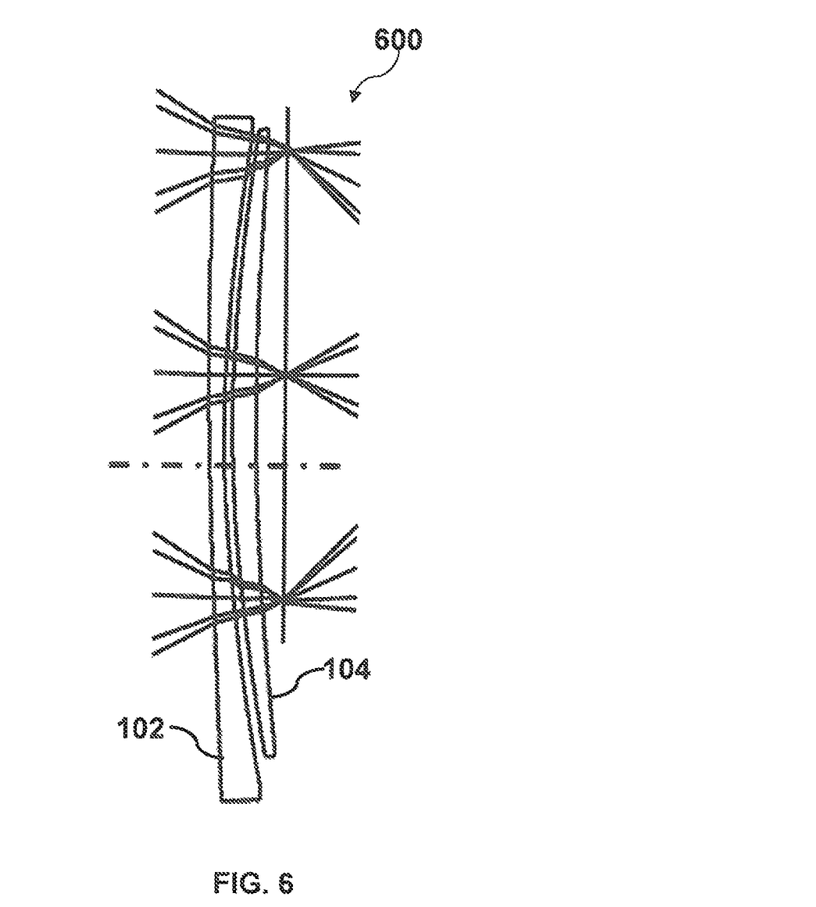
Figure 7:
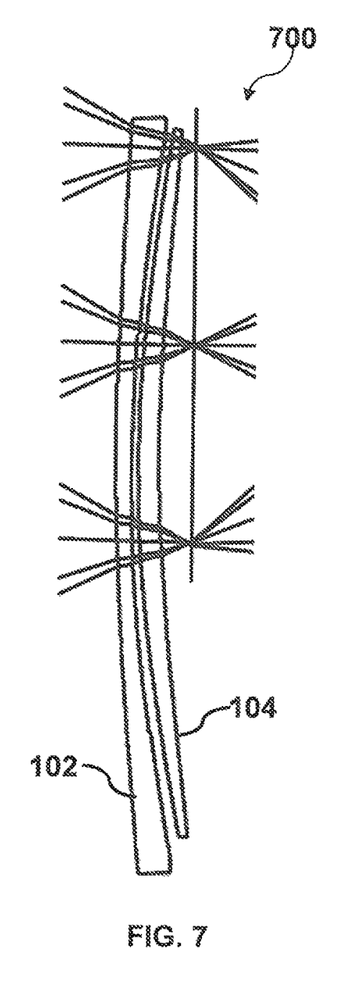

FIGS. 5-7 illustrate schematic diagram of optical refractive achromat LOS toggle utilized to scan multiple FORs in an imaging system. The materials of optical elements 102 and 104 are made of Germanium and ZnSe and have aspheric surfaces.

Figure 8A:
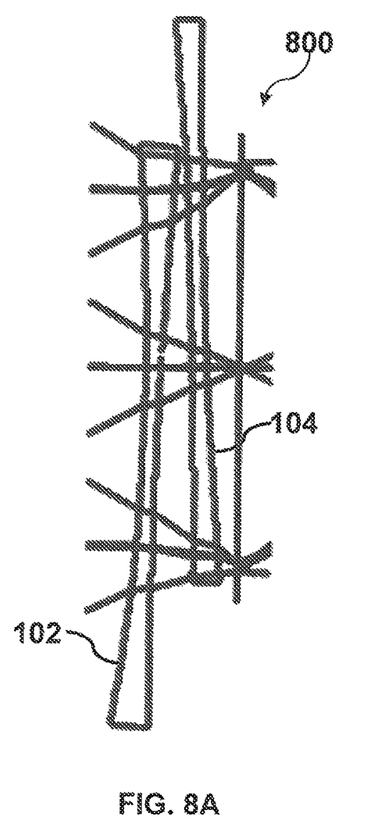
FIGS. 8A-8B illustrate schematic diagram of AMTIR1 and Zinc Selenide optical elements utilized for toggle correction, in accordance with the disclosed embodiments.
Figure 8B:
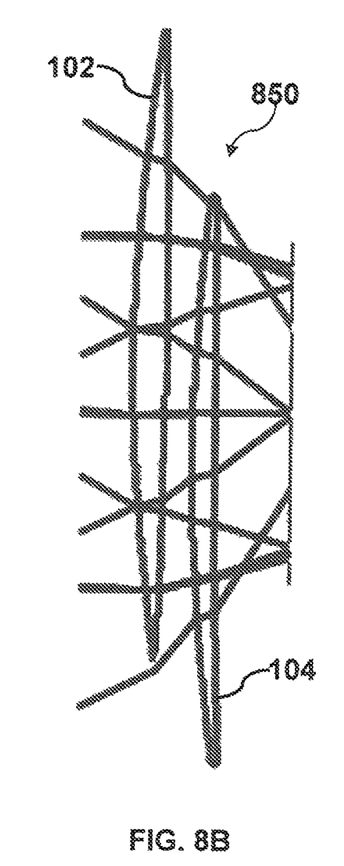
Figure 9A:
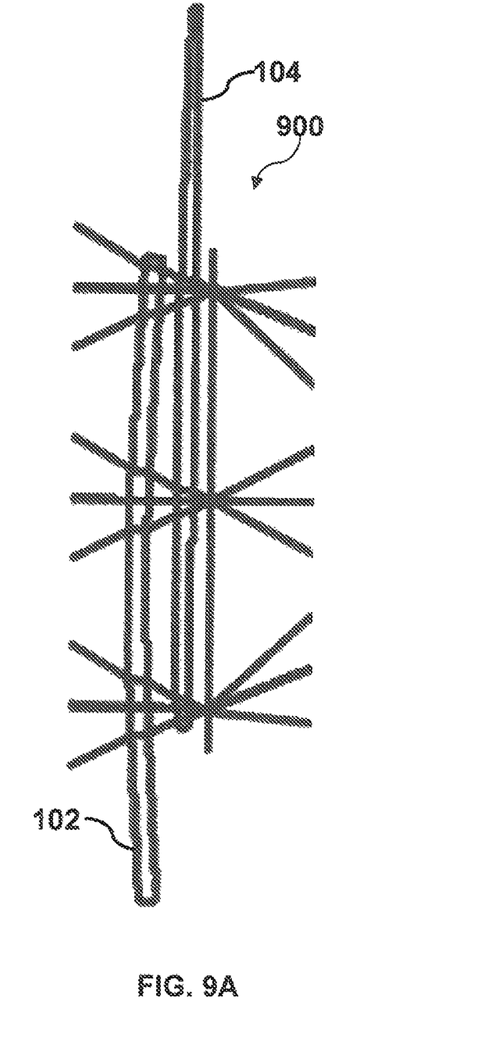
FIGS. 9A-9B illustrate schematic diagram of Germanium and Zinc Selenide optical elements utilized for toggle correction, in accordance with the disclosed embodiments.
Figure 9B:
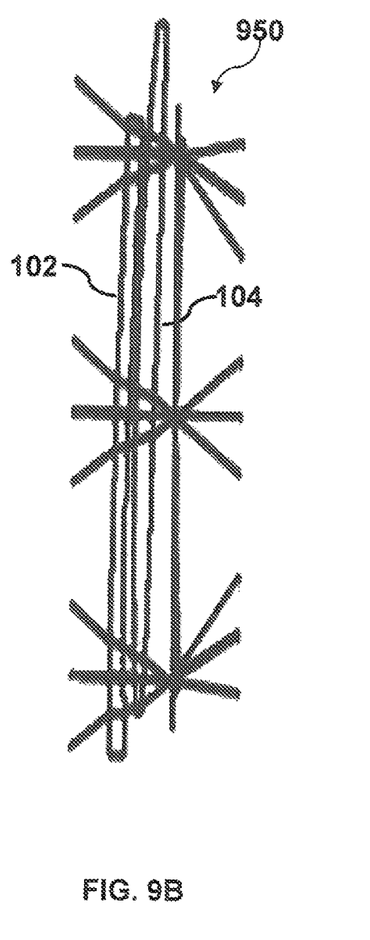

FIGS. 8A-8B illustrate schematic diagram of toggles 800 and 850 utilized for toggle correction. The toggles 800 and 850 can act as diverging negative/negative (−/−) system or converging positive/positive (+/+) system or both. FIGS. 9A-9B illustrate schematic diagram of toggles 900 and 950 utilized for toggle correction, in accordance with the disclosed embodiments. The toggles 900 and 950 can act as near net zero power (−/+) system or near net zero power (−/+) system.

In diverging negative/negative (−/−) system, like element powers are necessary to provide opposing de-centered configurations and aberrations are more than one order of magnitude greater than acceptable limit. In converging positive/positive (+/+) system, aberrations are more than two orders of magnitude greater than acceptable limit. Both −/− and +/+ systems exhibit significant non rotationally symmetric residual errors termed as anamorphic astigmatism and anamorphic distortion. In near net zero power (−/+) system, each element 102 and 104, made of Germanium & ZnSe with DOE and all surfaces are aspheric, is having low dispersion.

The optical image quality of the toggle module is corrected by a combination of aspheric shapes and diffractive surfaces on the optical surfaces of the two elements in the module to obtain prescribed discrete LOS shift. In order to maintain performance along any radial direction and to simplify fabrication, the aspheric shapes and diffractive surfaces should be rotationally symmetrical. Image quality is further improved through proper selection of the optical materials used to construct the optical elements.

Note that either the afocal space preceding the imaging optical system or an aberration corrected afocal space within the optical system is an acceptable location for the toggle elements. Also, the image quality is optimized for vacuum, air, or another gaseous substance to be interposed between the optical surfaces, rather than a lubricant.

Therefore, an embodiment of the present invention provides a vacuum-compatible optical LOS toggle capable of providing aberration corrected, high quality images while minimizing the size of mechanical drive machinery and limiting movement of the optical components.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An optical line of sight toggle apparatus comprising:
   a first optical element; and
   a second optical element positioned to shift a line of sight upon a lateral displacement of said first optical element relative to said second optical element, wherein at least one optical surface on said first optical element and said second optical element is diffractive.

2. The optical line of sight toggle apparatus of claim 1 wherein at least one optical surface on said first optical element and said second optical element is aspherical or spherical.

3. The optical line of sight toggle apparatus of claim 1 wherein said first optical element and said second optical element are both made of silicon.

4. The optical line of sight toggle apparatus of claim 1 wherein said first optical element and said second optical element are both made of germanium.

5. The optical line of sight toggle apparatus of claim 1 wherein said first optical element is made of silicon and said second optical element is made of germanium.

6. The optical line of sight toggle apparatus of claim 1 wherein image quality is corrected by a combination of aspheric or spheric shapes and diffractive surfaces on said optical surfaces of said first and second optical elements.

7. The optical line of sight toggle apparatus of claim 1 wherein said first and second optical elements are rotationally symmetrical.

8. The optical line of sight toggle apparatus of claim 1 wherein said optical surfaces of said first and second elements are shaped to work in combination with said lateral displacements of said first and second optical elements such that the line of sight angle is shifted.

9. An optical line of sight toggle apparatus comprising:
a first optical element comprised of a material selected from the group consisting of silicon and germanium; and
a second optical element comprised of a material selected from the group consisting of silicon and germanium positioned to shift a line of sight upon a lateral displacement of said first optical element relative to said second optical element, wherein at least one optical surface on said first optical element and said second optical element is diffractive, and at least one optical surface on said first optical element and said second optical element is diffractive and at least one optical surface on said first optical element and said second optical element is aspherical or spherical.

10. The optical line of sight toggle apparatus of claim 9 wherein image quality is corrected by a combination of aspheric or spheric shapes and diffractive surfaces on said optical surfaces of said first and second optical elements.

11. The optical line of sight toggle apparatus of claim 9 wherein said first and second optical elements are rotationally symmetrical.

12. The optical line of sight toggle apparatus of claim 9 wherein said optical surfaces of said first and second elements are shaped to work in combination with said lateral displacements of said first and second optical elements such that the line of sight angle is shifted.

13. A method of scanning a wide field of view optical sensor through multiple fields of regard comprising:
positioning a first optical element and a second optical element wherein at least one optical surface on said first optical element and said second optical element is diffractive and at least one optical surface on said first optical element and said second optical element is aspherical or spherical; and
shifting a line of sight upon a lateral displacement of said first optical element relative to said second optical element.

14. The method of claim 13 further comprising correcting image quality by a combination of aspheric or spheric shapes and diffractive surfaces on said optical surfaces of said first and second optical elements.

15. The method of claim 13 wherein said first and second optical elements are rotationally symmetrical.

16. The method of claim 13 wherein said optical surfaces of said first and second elements are shaped to work in combination with said lateral displacements of said first and second optical elements such that the line of sight angle is shifted.

17. The method of claim 13 wherein the first optical element is comprised of a material selected from the group consisting of silicon and germanium.

18. The method of claim 13 wherein the first optical element is comprised of a group consisting of silicon and germanium.

* * * * *